United States Patent
Puzey et al.

(10) Patent No.: US 6,429,958 B1
(45) Date of Patent: Aug. 6, 2002

(54) EXTINCTION RATIO OPTICAL COMMUNICATION DEVICE USING SUPERCONDUCTING FILMS

(75) Inventors: Kenneth A. Puzey; William J. Cottrell; Thomas G. Ference, all of Essex Junction, VT (US)

(73) Assignee: TeraComm Research, Inc., Essex Junction, VT (US)

( * ) Notice: Subject to any disclaimer, the term of this patent is extended or adjusted under 35 U.S.C. 154(b) by 0 days.

(21) Appl. No.: 09/815,975

(22) Filed: Mar. 22, 2001

(51) Int. Cl.[7] .................. G02B 26/00; G02B 1/23; G02B 1/03
(52) U.S. Cl. .................. 359/239; 359/278; 359/245
(58) Field of Search .................. 359/278, 245, 359/240, 127, 124, 326; 385/239, 88; 505/182, 181, 702, 828, 848, 866

(56) References Cited

U.S. PATENT DOCUMENTS

| | | | |
|---|---|---|---|
| 5,010,311 A | 4/1991 | Hed | 355/216 |
| 5,036,042 A | 7/1991 | Hed | 505/1 |
| 5,053,383 A | 10/1991 | Short et al. | 505/1 |
| 5,093,310 A | 3/1992 | Rosen | 505/1 |
| 5,403,673 A * | 4/1995 | Haga et al. | 428/688 |
| 5,532,210 A * | 7/1996 | Shen | 505/200 |
| 5,627,140 A | 5/1997 | Fossheim et al. | 505/401 |
| 5,721,194 A * | 2/1998 | Yandrofski et al. | 505/210 |
| 5,768,002 A | 6/1998 | Puzey | 359/245 |
| 5,886,809 A | 3/1999 | Puzey | 359/278 |
| 6,115,170 A | 9/2000 | Puzey | 359/278 |

OTHER PUBLICATIONS

Z. M. Zhang et al, Infrared Refractive Index of Thin $Yba_2Cu_3O_7$ Superconducting Films, Aug. 1992, Transactions of the ASME, V 114, p 644–652.

* cited by examiner

Primary Examiner—Georgia Epps
Assistant Examiner—Tim Thompson
(74) Attorney, Agent, or Firm—Yoriko Morita

(57) ABSTRACT

The optical assembly for modulating input light and providing modulated light at an output thereof includes a first arrangement, which includes a layer of a superconductive material having at least a part of the input light incident thereon as incident light. The superconductive material is switchable between a first state, in which the superconductive material exhibits a first refractive index, and a second state, in which the superconductive material exhibits a second refractive index. The first arrangement is configured to direct to the output as the modulated light a first fraction of the incident light, when the superconductive material is in the first state, and a second fraction of the incident light, when the superconductive material is in the second state, such that the modulated light exhibits a given value of extinction ratio, which is defined as a ratio of the first fraction of the incident light to the second fraction of the incident light at the output. The optical assembly further includes a second arrangement cooperating with the first arrangement to provide at the output of the optical assembly another value of the extinction ratio that is smaller than the given value.

92 Claims, 8 Drawing Sheets

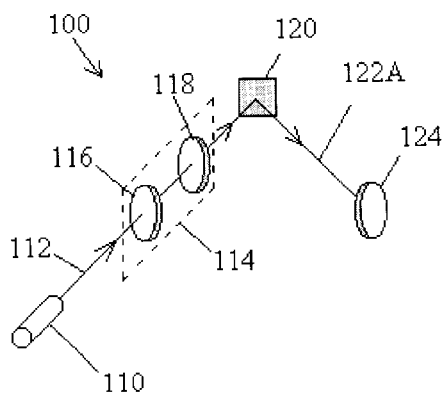
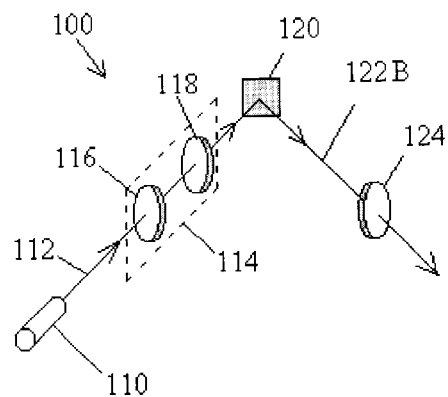
FIG. 2A          FIG. 2B
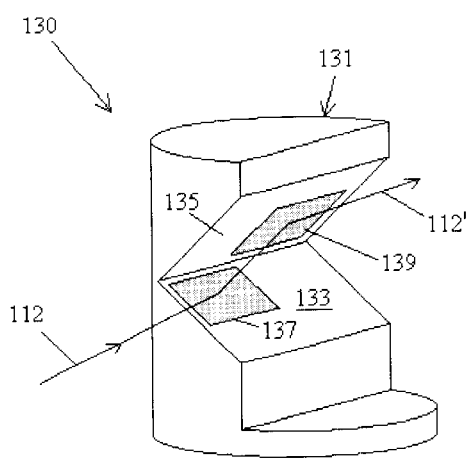
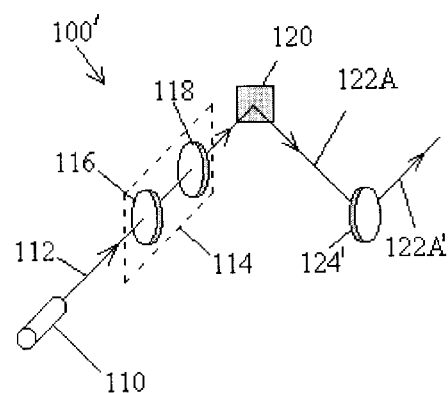
FIG. 2C          FIG. 2D

EXTINCTION RATIO OPTICAL COMMUNICATION DEVICE USING SUPERCONDUCTING FILMS

BACKGROUND OF THE INVENTION

The present invention relates generally to optical devices and, more particularly, to optical communication devices including a superconductive assembly in a data transmission scheme with low extinction ratio.

Developments in optical communication devices are driving the speed of optical communication systems ever faster. For example, high speed light modulators and data links based on superconductive materials have been demonstrated by Puzey in U.S. Pat. No. 5,768,002, U.S. Pat. No. 5,886,809, U.S. Pat. No. 6,115,170, copending U.S. patent application Ser. No. 09/637,098, now U.S. Pat. No. 6,285,487, and copending U.S. Patent Application Ser. No. 09/815,972 Attorney Docket Number PUZ-P001CIP. All of the aforementioned patents and patent applications of Puzey are co-assigned assigned with the present application and are incorporated herein by reference. Optical devices based on superconductive materials are capable of operating at high data rates such as, for example, transmitting optical data signals at data rates of terabits per second (Tbit/s) at a given wavelength over a single optical fiber.

As described in the aforementioned Puzey patents and patent applications, a superconductive material is in a superconducting state when the current density in the material, magnetic field around the material and temperature of the material are below certain critical values. In the superconducting state, the superconductive material exhibits properties of an essentially perfect conductor. The electrical resistance of the material is substantially zero in the superconducting state, and the material reflects electromagnetic radiation with high reflectivity. When any of the above conditions is not met, such that the current density, magnetic field or temperature rises above its respective critical value, the material no longer behaves as a superconductor and is in a normal (non-superconducting) state. In the normal state, the material behaves in a manner similar to that of semiconductor materials in that some portion of an incident electromagnetic radiation is transmitted therethrough. The change in the electromagnetic properties of the superconductive material is used in optical devices to produce, for example, the high speed optical modulators of Puzey.

One of the factors limiting the use of superconductors in device applications resides in the difficulty in achieving a low extinction ratio in the modulated optical signal. Extinction ratio of an optical device is defined as a ratio of a first optical signal intensity produced by the device, when the device is nominally producing a null signal, to a second optical signal intensity produced by the device, when the device is intended to be producing a non-zero optical signal. For example, the extinction ratio of an optical device based on a superconductive material can be defined as the ratio of a first signal intensity of the device, when the superconductive material is in the superconducting state, to a second signal intensity, when the superconductive material is in the normal state. Using prior art optical modulators using a single superconducting film, such as those described in the aforementioned Puzey patents, the Applicants have achieved extinction ratios of at most 1:4. Current industry standards require an extinction ratio of at least 1:20 for a optical device that produces a digital, optical signal.

The present invention provides optical communication devices which serve to resolve the problems described above with regard to prior art optical communication devices based on superconductive materials in a heretofore unseen and highly advantageous way and which provides still further advantages.

SUMMARY OF THE INVENTION

As will be described in more detail hereinafter, there is disclosed herein an optical assembly for modulating input light and providing modulated light at an output thereof is disclosed. The optical assembly includes a first arrangement, which in turn includes a layer of superconductive material having at least a part of the input light incident thereon as incident light. The superconductive material is switchable between a first state, in which the superconductive material exhibits a first refractive index, and a second state, in which the superconductive material exhibits a second refractive index. The first arrangement is configured to direct to the output as the modulated light a first fraction of the incident light, when the superconductive material is in the first state, and a second fraction of the incident light, when the superconductive material is in the second state, such that the modulated light exhibits a given value of extinction ratio. The extinction ratio is defined as a ratio of the first fraction of the incident light to the second fraction of the incident light at the output. The optical assembly further includes a second arrangement cooperating with the first arrangement to provide at the output of the optical assembly another value of the extinction ratio that is smaller than the given value.

In another aspect of the invention, the superconductive material of the first aspect of the invention is additionally configured to selectively modulate the incident light such that the superconductive material, when in the first state, sets the modulated light to a first polarization state, and, when in the second state, sets the modulated light to a second polarization state. The second arrangement includes a polarizing arrangement for setting the input light to a known, initial polarization state, and an analyzer configured to receive the modulated light and to selectively absorb or reflect substantially all of the modulated light of the first polarization state while transmitting at least a portion of the modulated light of the second polarization state therethrough.

In still another aspect of the invention, the incident light of the first aspect of the invention has a particular wavelength and the superconductive material exhibits a first reflectance in the first state and a second reflectance in the second state. The second arrangement in this aspect includes a reflective surface positioned substantially parallel to and spaced apart from the layer of superconductive material such that the reflective surface cooperates with the layer of superconductive material to form an etalon. The etalon is configured to block or reflect substantially all of the incident light of the particular wavelength, when the superconductive material is in the first state, and to direct the incident light of the particular wavelength to the output, when the superconductive material is in the second state.

In yet another aspect of the invention, the superconductive material of the first aspect is further configured such that the incident light, which is incident on a surface of the layer of superconductive material, emerges as the modulated light at a first spot on an opposite surface of the layer of superconductive material in the first state, and at a distinct, second spot on the opposite surface of the layer of superconductive material in the second state. The second arrangement in this aspect includes a light directing arrangement for directing the modulated light to the output.

In a further aspect of the invention, the superconductive material of the first aspect is additionally configured to reflect the incident light such that the superconductive material, when in the first state, produces the modulated light with a first phase lag and, when in the second state, produces the modulated light with a second phase lag. The second arrangement of this aspect includes a polarizing arrangement for setting the input light in a known, initial polarization state, and a compensator configured to compensate for the first phase lag such that, when the superconductive material is in the first state, the modulated light is linearly polarized while, when the superconductive material is in the second state, the modulated light is elliptically polarized after being acted upon by the compensator. The second arrangement further includes a directing configuration, which in turn includes a directing arrangement and a dielectric plate. The directing arrangement is configured to direct the modulated light to the dielectric plate. The dielectric plate is oriented such that, when the superconductive material is in the first state, the modulated light is incident on the dielectric plate at Brewster's angle and the modulated light is transmitted substantially unaltered through the dielectric plate while, when the superconductive material is in the second state, at least a portion of the modulated light is reflected by the dielectric plate to the output.

In a still further aspect of the invention, a method for modulating input light and providing modulated light at an output is disclosed. The method includes the step of directing at least a part of the input light as incident light at a layer of superconductive material. The superconductive material is switchable between a first state, in which the superconductive material exhibits a first refractive index, and a second state, in which the superconductive material exhibits a second refractive index. The method further includes the step of arranging the superconductive material such that, when the superconductive material is in the first state, a first fraction of the incident light is directed to the output as modulated light and, when the superconductive material is in the second state, a second fraction of the incident light is directed to the output as modulated light. The modulated light has a given value of extinction ratio, which is defined as a ratio of the first fraction of the incident light to the second fraction of the incident light at the output. The method also includes the step of acting on at least one of the input light and the first and second fractions of incident light so as to provide at the output another value of the extinction ratio that is smaller than the given value.

BRIEF DESCRIPTION OF THE DRAWINGS

The present invention may be understood by reference to the following detailed description taken in conjunction with the drawings briefly described below.

FIGS. 2A and 2B are diagrammatic illustrations of an optical device with reduced extinction ratio designed in accordance with the present invention and employing a combination of polarization optics to manipulate the polarization state of the optical device.

FIG. 2C is a diagrammatic illustration of a compensator arrangement suitable for use with the optical device shown in FIGS. 2A and 2B.

FIG. 2D is a diagrammatic illustration of the optical device shown in FIGS. 2A and 2B with a modification in the analyzer.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

In addition to its electromagnetic properties, the refractive index of a superconductive material changes in value between the superconducting and normal states (see, for example, Zhang et al., "Infrared Refractive Index of Thin $Yb_2Cu_3O_7$ Superconducting Films," Transactions of the American Society of Mechanical Engineers, Journal of Heat Transfer, Vol. 114, August 1992, page 644–652). For instance, according to Zhang et al., the complex refractive index value of a typical superconductive material in the superconducting state is $n=5.5+19i$, while the complex refractive index value of the same material in the non-superconducting state is $n=10.5+14i$, where both refractive index values are calculated at a wavelength of 25 μm. The present invention takes advantage of this characteristic of superconductive materials to achieve heretofore unseen optical devices with advantageous properties.

Figure 1:
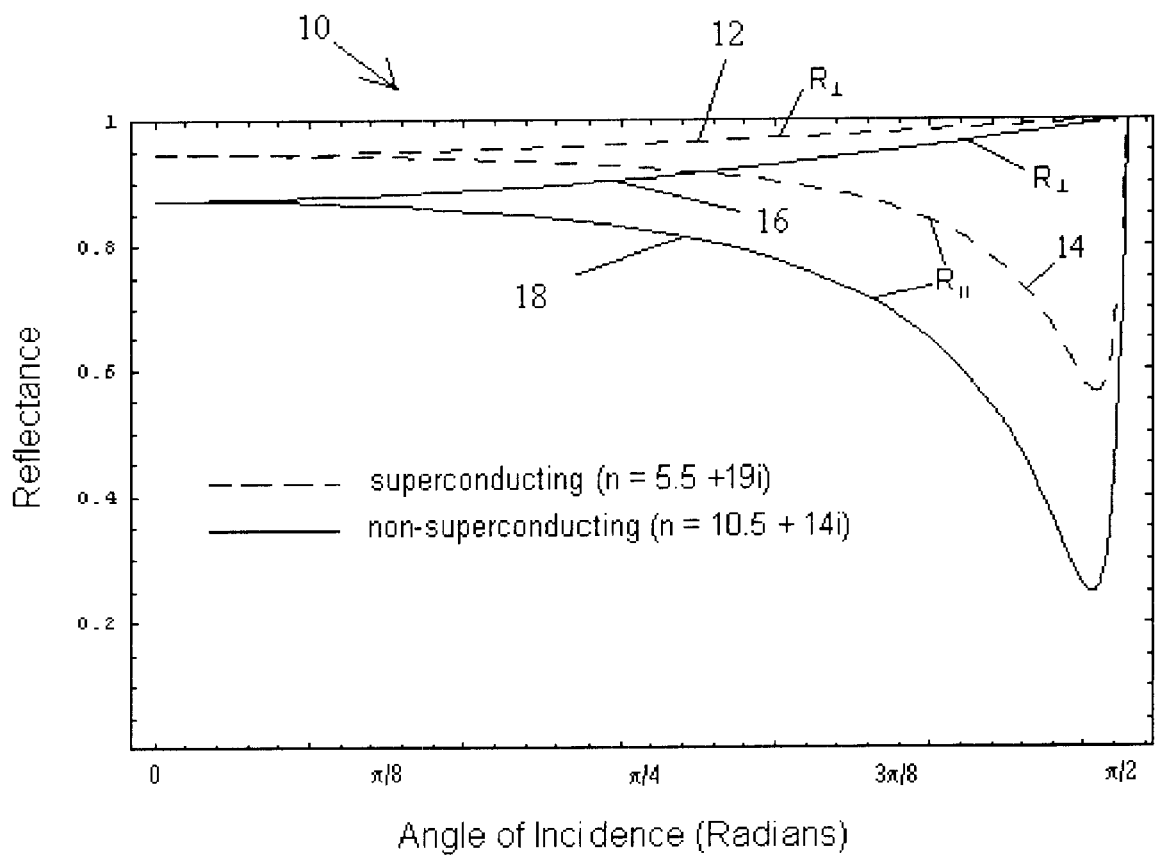
FIG. 1 is a graph of the reflectance curves for orthogonal states of polarization of a superconductive material based on the refractive indices from Zhang et al., shown here to illustrate the differences in reflectance for a superconductive material in the superconducting state versus the normal (non-superconducting) state.

The refractive index change in the superconductive material between superconducting and non-superconducting states leads to change in the reflectance of the superconductive material according the well-known Fresnel equations (see, for example, Hecht, *Optics*, Addison-Wesley Publishing Company, 1987). The value of reflectance exhibited by the superconductive material differs significantly with the angle of incidence, polarization state of the incident light and the state of superconductive material, as shown in FIG. 1. FIG. 1 includes a plot, generally indicated by the reference number 10, illustrating the differences in the reflectance values for incident light of orthogonal polarization states as well as for different states of the superconductive material at a wavelength of 25 μm. In a manner consistent with the commonly used terminology of the art, $R_\parallel$=reflectance for incident light of a polarization state parallel to the plane of incidence, and $R_\perp$=reflectance for incident light of a polarization state perpendicular to the plane of incidence. In addition, as is clearly evident in plot 10, the reflectance value of the superconductive material displays a strong dependence on whether the superconductive material is in its superconducting state (indicated by dashed lines 12 and 14) or the non-superconducting state (indicated by solid lines 16 and 18). Conversely, since the superconductive material exhibits different reflectance values for orthogonally polarized light, the superconductive material will alter the polarization state of light incident thereon. Moreover, the difference in the refractive index of the superconductive material between its superconducting state and the non-superconducting state also results in a difference in the transmittance of the superconductive material, again according to the Fresnel equations.

The aforedescribed dependence of the reflectance of the superconductive material on whether it is in the superconducting state or the non-superconducting state is used to reduce the extinction ratio of a light modulator based on the superconductive material in one aspect of the present invention, as illustrated in FIG. 2A. It is noted that like components are indicated by like reference numbers throughout the various figures. A light modulator 100 as shown in FIG. 2A includes a light source 110, which emits a light 112 having a predetermined wavelength $\lambda$. Light source 110 may be a laser, such as a quantum cascade laser or a germanium laser, a light emitting diode, or any other suitable light source commonly known in the art or yet to be developed. Light 112 is directed into a polarizing arrangement 114. Polarizing arrangement 114 is configured to set light 112 in a known polarization state. In the specific embodiment shown in FIG. 2A, polarizing arrangement 114 includes a polarizer 116 and a compensator 118, wherein the combination of polarizer 116 and compensator 118 serves to set light 112 in an elliptical polarization state. Light 112, now in the elliptical polarization state, is incident on a layer of superconductive material 120, which is configured to reflect light 112 incident thereon and to redirect the light as reflected light 122A while also affecting its polarization state. In particular, superconductive material 120 of FIG. 2A is in the non-superconducting state and sets reflected light 122A in a first polarization state. Reflected light 122A is directed into an analyzer 124. Analyzer 124 is configured to selectively absorb light incident thereon of the first polarization state, such that reflected light 122A is essentially blocked by analyzer 124 whereby no optical signal is emitted by light modulator 100 when superconductive material 120 is in the non-superconducting state. For example, polarizer 116 and analyzer 124 may be, but not limited to, a wire grid polarizer or a dielectric Brewster polarizer, such as those made of z-cut quartz.

Attention is now directed to FIG. 2B, which illustrates light modulator 100 when the superconductive material is in the superconducting state. When light 112 is incident on superconductive material 120, superconductive material 120 redirects light 112 as a reflected light 122B. Reflected light 122B is in a second polarization state after reflection off of superconductive material 120 due to the difference in the refractive index of superconductive material in the superconducting state as compared to in the non-superconducting state. Analyzer 124 now allows at least a portion of light 122B to be transmitted therethrough so that a non-zero optical signal 125 is emitted by light modulator 100.

Referring to FIG. 2B in conjunction with FIG. 2A, light modulator 100 advantageously uses the difference in the refractive index of the superconductive material between the superconducting state and the non-superconducting state to modulate light by selectively blocking or transmitting light. Analyzer 124 acts as a selective blocker of light reflected from superconductive material 120 by blocking reflected light of the first polarization state while transmitting reflected light of the second polarization state. Thus, light modulator 100 produces modulated light by switching superconductive material 120 between the non-superconducting state (in which essentially no optical signal is emitted by light modulator 100) and the superconducting state (in which a non-zero optical signal is emitted by light modulator 100).

Continuing to refer to FIGS. 2A and 2B, the extinction ratio of the light modulator is minimized since essentially no optical signal is produced by the light modulator when the superconductive material is in the non-superconducting state. In this way, much lower extinction ratios compared to those previously achieved by single superconducting film optical modulators are achievable. Since the extinction ratio of light modulator 100 is substantially governed by the efficiency, homogeneity and surface roughness of the polarization optics, the use of highly efficient optical elements in the light modulator as illustrated in FIGS. 2A and 2B will result in an optimized low extinction ratio evidenced by low loss of the original light intensity.

It should be noted that various modifications to the light modulator illustrated in FIGS. 2A and 2B are possible without deviating from the spirit and scope of the present invention. The specific wavelength $\lambda$ of light 112 is chosen to be compatible with the superconductive material used in the light modulator such that the superconductive material exhibits a sufficient change in the refractive index between the superconducting and non-superconducting states at the chosen wavelength. For example, infrared light sources, such as quantum cascade lasers, germanium lasers and bismuth antimony lasers are suitable as the light source to provide light in the far infrared wavelengths, which wavelengths are compatible with certain types of superconductive materials. As an alternative, polarizing arrangement 114 and analyzer 124 may be configured such that the light modulator will produce a non-zero optical signal when the superconductive material is in the non-superconducting state while producing essentially no optical signal when the superconductive material is in the superconducting state (i.e., the analyzer absorbs or deflects reflected light of the second polarization state while transmitting therethrough light of the first polarization state). Additional optical components, such as but not limited to lenses and filters, can be included in the light modulator to control the light during propagation through the light modulator.

Referring now to FIG. 2C in conjunction with FIGS. 2A and 2B, a compensator arrangement 130, which is suitable for use as compensator 118 is illustrated as an example of a modification to the light modulator shown in FIGS. 2A and 2B. Compensator arrangement 130 includes a mounting block 131, which in turn includes a first mounting face 133 and a second mounting face 135. First mounting face 133 and second mounting face 135 are disposed perpendicularly to one another. A first superconductive film 137 and a second superconductive film 139 are attached to first mounting face 133 and second mounting face 135, respectively. Each of first superconductive film 137 and second superconductive film 139 is switchable between superconducting and non-superconducting states. Light 112, following transmission through polarizer 116 of FIGS. 2A and 2B, is incident on compensator arrangement 130 such that the first and second superconductive films set light 112 to a desired polarization state. Unlike most commercially available compensators, which generally do not function in the far infrared wavelengths, compensator arrangement 130 is compatible with the far-infrared wavelengths. By incorporating superconductive materials as the optically active medium, compensator arrangement 130 overcomes the problem of the dearth of readily available compensators for wavelengths compatible with superconductor-based devices, which generally operate in the far infrared wavelengths at the present time. It may also be possible to replace compensator arrangement 130 with an appropriately oriented dielectric material, such as z-cut quartz, with suitable characteristics in the far-infrared wavelengths.

Referring to FIG. 2D, a diagrammatic illustration of a possible modification to the light modulator of FIGS. 2A and 2B is illustrated. A modified light modulator 100' includes essentially the same optical components used in light modulator 100 of FIGS. 2A and 2B, except for a modification in the analyzer. Instead of analyzer 124, which is configured to selectively absorb light incident thereon of the first polarization state, an analyzer 124' of FIG. 2D is configured to selectively reflect or deflect light incident thereon of the first polarization state. In this way, no optical signal is emitted by modified light modulator 100' when superconductive material 120 is in the non-superconducting state. Analyzer 124' can be further configured to allow at least a portion of light to be transmitted therethrough when superconductive material 120 is in the superconducting state. Thus, like light modulator 100 of FIGS. 2A and 2B, modified light modulator 100' produces modulated light.

Figure 3A:
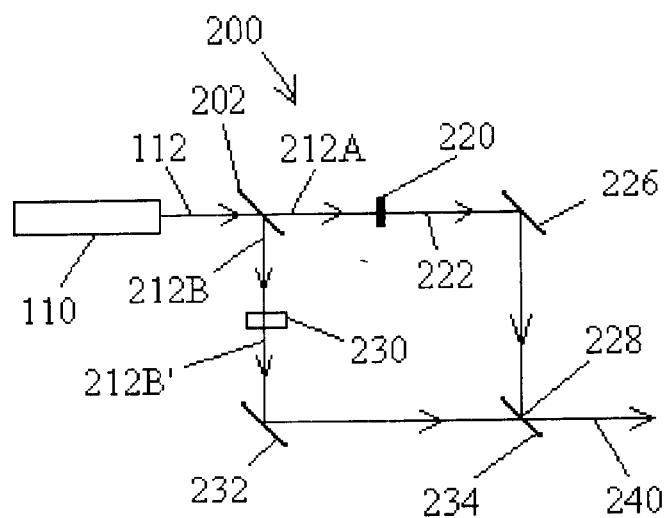
FIG. 3A is a diagrammatic illustration of an alternate embodiment of an optical device with reduced extinction ratio designed in accordance with the present invention and employing an inteferometric technique.

Turning now to FIG. 3A, a diagrammatic illustration of another embodiment of an optical device designed in accordance with the present invention and employing an interferometric technique is generally indicated by the reference number 200. Light modulator 200 again takes advantage of the property of the superconductive material in exhibiting significantly different refractive index values depending on whether it is in the superconducting or non-superconducting state.

Like light modulator 100 of FIGS. 2A and 2B, light modulator 200 includes light source 110 providing light 112 of a predetermined wavelength λ. In light modulator 200, however, light 112 is directed to a splitter 202, which divides light 112 into a first light portion 212A and a second light portion 212B. For example, splitter 202 may be, but not limited to, a dielectric material such as z-cut quartz, polyethylene, magnesium oxide, silicon oxide, Mylar or diamond. First light portion 212A is directed into a layer of superconductive material 220 operating in a transmissive mode. Superconductive material 220 is switchable between a superconducting state, in which a first fraction of first light portion 212A is allowed therethrough, and a non-superconducting state, in which a second fraction of first light portion 212A is allowed therethrough, such that the first light portion is converted to a modulated light 222. In other words, modulated light 222 is essentially a light signal, the intensity of which at a given moment depends on whether superconductive material 220 is in the superconducting or the non-superconducting state. Modulated light 222 is then directed by a first reflector 226 to a combiner 228.

Continuing to refer to FIG. 3A, second light portion 212B is directed through an attenuator 230. Attenuator 230 is configured such that an attenuated, second light portion 212B' matches the aforementioned, first fraction of first light portion 212A in intensity. Attenuator 230 may be, for instance, a partially reflective coating on a dielectric material, such as a gold coating on z-cut quartz, or crossed, wire grid polarizers. Attenuated, second light portion 212B' is then reflected by a second reflector 232 to combiner 228. Combiner 228 combines attenuated, second light portion 212B' with modulated light 222 into a combined signal 240. Combiner 228 can be made of, for example, a dielectric such as z-cut quartz, polyethylene, magnesium oxide, silicon oxide, Mylar, diamond, or any other suitable material.

The positions of the first and second reflectors are arranged such that attenuated, second light portion 212B' interferes with modulated light 222 at combiner 228. That is, the distance from splitter 202 via superconductive material 220 and first reflector 226 to combiner 228 differs from the distance from splitter 202 via attenuator 230 and second reflector 232 to combiner 228 by an odd integer multiple of λ/2. In this way, attenuated, second light portion 212B' destructively interferes with modulated light 222 when superconductive material 220 is in the superconducting state such that combined signal 240 is essentially zero (i.e., a "null" state). In other words, the null state occurs when superconductive material 220 is in the superconducting state and, the intensity of modulated light 222 is essentially equal in intensity to the attenuated, second light portion 212B' such that the modulated light 222 and the attenuated second light portion 212B' destructively interfere. When superconductive material 220 is in the non-superconducting state, modulated light 222 exceeds attenuated, second light portion 212B' such that combined signal 240 is non-zero. Thus, light modulator 200 uses an interferometry technique to produce combined signal 240 with a clear distinction between the null states and the non-zero signal states, reducing the extinction ratio as a result.

Several modifications are possible in the light modulator of FIG. 3A. For example, superconductive material 220 can be incorporated into first reflector 226 by using a layer of superconductive material in the reflective mode. Also, the change in the refractive index of superconductive material 220 between the superconducting and non-superconducting states can be utilized to maximize the intensity of combined signal 240 in the non-zero signal state by constructive interference between attenuated, second light portion 212B' and modulated light 222 when superconductive material 220 is in the non-superconducting state. In this case, the theoretical amplitude of combined signal 240 in the non-zero signal state is the sum of the amplitudes of attenuated, second light portion 212B' and modulated light 222. Hence, the amplitude of the combined signal in the non-zero signal state is increased, and the extinction ratio is again reduced.

Furthermore, whereas light modulator 200 is configured as a Michelson interferometer, other interferometer configurations such as, for example, the Mach-Zehnder can also be used.

Figure 3B:
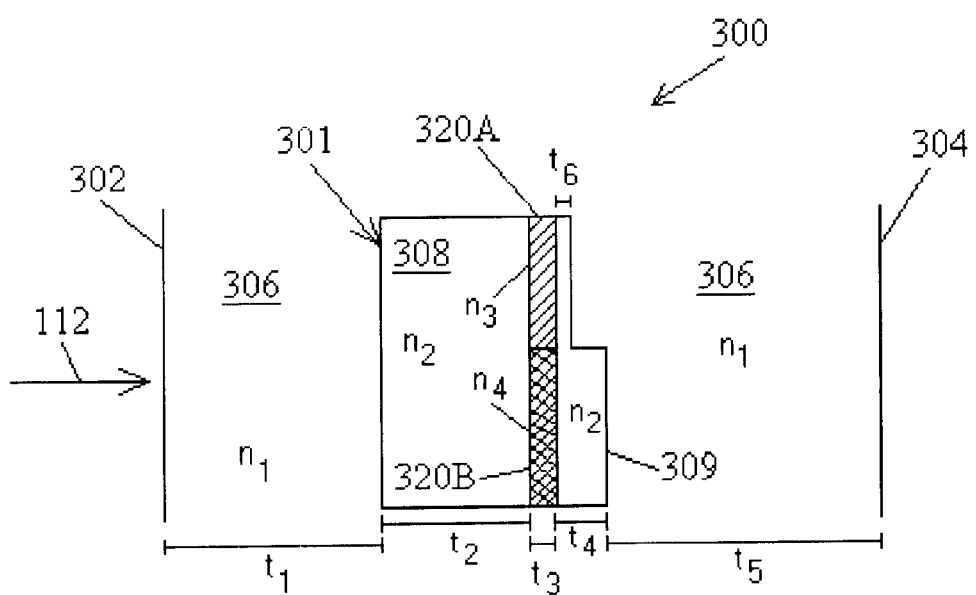
FIG. 3B is a diagrammatic illustration of another implementation of the interferometric technique using a wavefront splitting arrangement.

Another variation of the light modulator using the interferometric technique is shown in FIG. 3B generally indicated by the reference number 300. Light modulator 300 takes advantage of a wavefront splitting arrangement 301 to split the wavefront of light 112 from a suitable light source such as previously described light source 110 impinging on light modulator 300 to effect the interference. Light 112 essentially travels from an entry plane 302 to an exit plane 304. The optical path length seen by light 112 in traveling from entry plane 302 to exit plane 304 differs depending on which part of wavefront splitting arrangement 301 the light travels through, as will be described hereinafter.

Wavefront splitting arrangement 301 is surrounded by a surrounding medium 306 having a refractive index $n_1$. The distance from entry plane 302 to wavefront splitting arrangement 301 is defined as $t_1$. Wavefront splitting arrangement 301 includes a first substrate 308, having a refractive index $n_2$ and a thickness $t_2$, and a second substrate 309, also having a refractive index $n_2$, with a layer of superconductive material of a thickness $t_3$ positioned therebetween. The superconductive material is divided into a superconductive layer 320A, having a refractive index $n_3$, and a doped superconductive layer 320B, having a refractive index $n_4$. Doped superconductive layer 320B is doped with an appropriate dopant such that it exhibits different critical values (current density, magnetic field and temperature) for switching between the superconducting and non-superconducting states compared to the critical values exhibited by undoped, superconductive layer 320A. [This process can also be accomplished, for example, by radiation or an Ion Beam Assisted Deposition (IBAD) process. See, for example, U.S. Pat. No. 5,053,383 to Short et al., U.S. Pat. No. 5,093,310 to Rosen and U.S. Pat. No. 5,627,140 to Fossheim, et al. The three patents mentioned immediately above are incorporated herein by reference.] The refractive index $n_4$ of doped superconductive layer 320B also potentially differs from refractive index $n_3$ of superconductive layer 320A. The thickness of second substrate 309 is $t_4$ over the region corresponding to doped superconductive layer 320B and $t_6$ over the region corresponding to superconductive layer 320A. The wavefront of light 112 incident on wavefront splitting arrangement 301 is split into a first portion, which travels through superconductive layer 320A, and a second portion, which travels through doped superconductive layer 320B.

According to definitions commonly used in the art, the optical path length (OPL1) for light traveling from entry plane 302 to exit plane 304 through the portion of wavefront splitting arrangement 301 including superconductive layer 320A as shown in FIG. 3B is:

$$OPL1 = n_1 t_1 + n_2 t_2 + n_3 t_3 + n_2 t_6 + n_1(t_4 + t_5 - t_6).$$

Similarly, the optical path length (OPL2) for light traveling from entry plane 302 to exit plane 304 through the portion of wavefront splitting arrangement 301 including doped superconductive layer 320B as shown in FIG. 3B is:

$$OPL2 = n_1 t_1 + n_2 t_2 + n_4 t_3 + n_2 t_4 + n_1 t_5.$$

Then, for $n_3 = n_4$, the difference (OPD) between OPL1 and OPL2 is given by:

$$OPD = n_2(t_4 - t_6) - n_1(t_4 - t_6).$$

If thickness $t_4$ is configured such that OPD is an odd integer multiple of $\lambda/2$, light reaching exit plane 304 via OPL1 is out of phase with light reaching exit plane 304 via OPL2, therefore resulting in destructive interference.

Figure 3C:
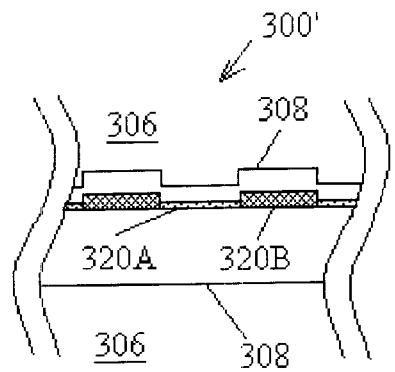
FIG. 3C is a diagrammatic illustration of a transmission grating in an extension of the interferometric technique using a wavefront splitting arrangement.
Figure 3D:
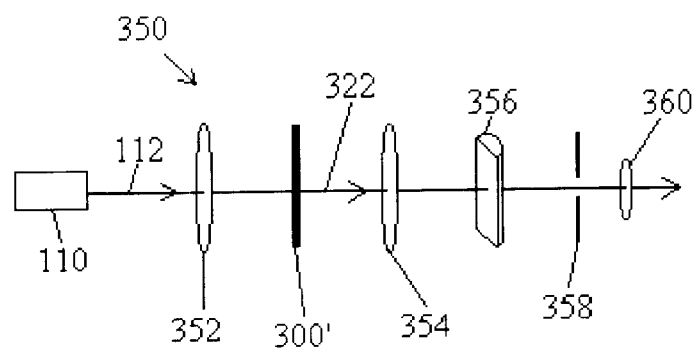
FIG. 3D is a diagrammatic illustration of one implementation of a system using the interferometric technique of FIG. 3C.

Turning now to FIGS. 3C and 3D, the wavefront splitting arrangement of FIG. 3B is turned sideways and periodically repeated to form a transmission grating 300'. Transmission grating 300' is formed of the same structure as wavefront splitting arrangement 300 repeated a number of times. When coherent light is directed through transmission grating 300', the transmission grating acts as two superimposed arrays of coherent oscillators, the array oscillations being out of phase by a factor $\pi$ between the two arrays. If the absorption values through the two paths (i.e., OPL1 through superconductive layer 320A and OPL2 through doped superconductive layer 320B) are essentially the same when the superconductive layer and the doped superconductive layer are both in the same state, such as the non-superconducting state, the split wavefronts destructively interfere such that total intensity transmitted through transmission grating 300' is effectively zero. When the superconductive layers are switched to the superconducting state (while the doped superconductive layers remain in the non-superconducting state), the absorption value through the superconductive layers are changed, and the split wavefronts no longer completely destructively interfere, resulting in a non-zero intensity being transmitted through transmission grating 300'.

FIG. 3D illustrates a way in which transmission grating 300' can be used in a light modulator system generally indicated by the reference numeral 350. Light modulator system 350 includes laser 110 emitting light 112. Light 112 is directed through a lens 352 then to transmission grating 300'. A transmitted, modulated light 322, produced by grating 300' is then directed through a series of optical components (a focusing lens 354, a cylindrical lens 356, a pin hole 358 and a collimating lens 360, in the embodiment shown in FIG. 3D). The series of optical components serve to focus and clean up modulated light 322 such that the optical energy transmitted through the system is increased. If OPD is set to an odd integer multiple of $\lambda/2$, modulated light 322 defines a series of null signals in a plane normal to the plane of the figure, when superconductive layers 320A are in the non-superconducting state such that the split wavefronts destructively interfere, and non-zero signals in the form of a Fraunhofer diffraction pattern, when superconductive layers 320A are in the superconducting state. In this way, light modulator system 350 uses transmission grating 300' to produce modulated light. By proper configuration of OPD, the null signals in modulated light 322 can be minimized while maximizing the non-zero signals, thus reducing the extinction ratio.

Figure 3E:
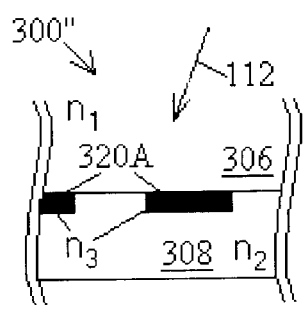
FIG. 3E is a diagrammatic illustration of a reflection grating in yet another implementation of the interferometric technique of FIG. 3C.

FIG. 3E illustrates a reflective grating, which is a variation of the wavefront splitting arrangement, generally indicated by the reference numeral 300". Reflective grating 300" is essentially a reflective equivalent of transmissive grating 300' of FIG. 3C. As in transmission grating 300', reflective grating 300" uses the change in reflectivity of the superconductive layers 320A between the superconducting and non-superconducting states. In addition, reflective grating 300" utilizes the inherent $\pi$ phase shift in the polarization state of light reflected at an interface between media of two different refractive indices when the light is incident on the interface from a medium with a lower refractive index than the reflecting medium. In the embodiment shown in FIG. 3E, surrounding medium 306, substrate 308 and superconductive layers 320A in the non-superconducting state have refractive index values $n_1$, $n_2$ and $n_3$, respectively. The refractive index values are arranged in the order $n_2<n_1<n_3$ such that light reflected by the superconducting layers ($n_1/n_3$ interface) experiences the π phase shift while light reflected by the non-superconducting regions ($n_1/n_2$ interface) is not phase shifted. Hence, light reflected by superconductive layers 320A in the non-superconducting state destructively interferes with light reflected by the non-superconducting regions such that the total intensity reflected by reflective grating 300" is effectively zero. When superconductive layers 320A are switched to the superconducting state, the reflectance value of the superconductive layers are changed, and the split wavefronts no longer completely destructively interfere, resulting in a non-zero intensity being reflected by reflective grating 300". The extinction ratio of a light modulator based on reflective grating 300" is minimized by ensuring the null signal, when superconductive layers 320A are in the non-superconducting state, is essentially zero. Reflective grating 300" offers the advantage that the input light does not need to be coherent because the operation of reflective grating 300" does not depend on changes in the optical path length, as is the case of transmission grating 300'.

Figure 4A:
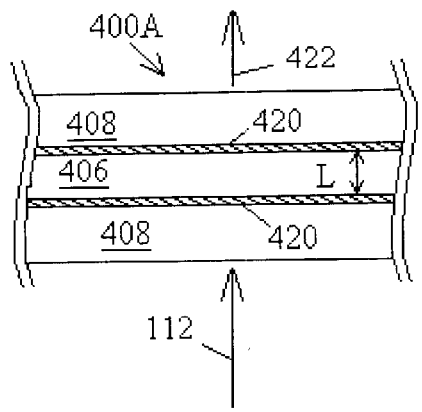
FIGS. 4A–C are diagrammatic illustrations of still another embodiment of an optical device with reduced extinction ratio, designed in accordance with the present invention and employing an etalon technique.

Turning now to FIGS. 4A, yet another implementation of the interferometric technique is shown, generally indicated by the reference numeral 400A. Etalon 400A including a medium 406 separating two substrates 408. Each of substrates 408 includes a layer of superconductive material 420 deposited thereon. Substrates 408 are assembled such that the substrate surfaces with layers of superconductive material are facing each other and spaced apart by a distance L. Medium 406 can be, for example, a suitable optical material, such as magnesium oxide, silicon oxide, z-cut quartz diamond or polyethylene, or simply an air gap. A high efficiency etalon can be achieved by positioning substrates 408, and consequently layers of superconductive material 420, substantially parallel to each other, for example.

Continuing to refer to FIG. 4A, etalon 400A is basically a Fabry-Perot etalon with the superconductive layers acting as reflectors with variable reflectance. Since the transmission and reflection properties of etalon 400A depend on the reflectance of the superconductive layers, the change in reflectance of the superconductive layers is essentially amplified by the resonating properties of the Fabry-Perot etalon, thus enhancing the extinction ratio. In other words, light 112 incident on etalon 400A is transmitted or absorbed (or reflected) by etalon 400A depending on the state of the superconductive layers such that etalon 400A produces a modulated light 422. For example, etalon 400A can be configured to transmit light of a selected wavelength when the superconductive layers are in the superconducting state, while effectively blocking light of that selected wavelength when the superconductive layers are in the non-superconducting state. By manipulating the reflectance property of the superconductive layers and setting distance L to an appropriate value, the extinction ratio of etalon 400A can be reduced. For example, extinction ratio of approximately 1:20 or better can be achieved by using superconductive layers which exhibit reflectance R=95% in the superconducting state and reflectance R=80% in the normal, non-superconducting state.

In addition, distance L as shown in FIG. 4A should be small compared to the distance traveled by each bit in the input light signal. The value of distance L is especially crucial when the etalon is to be used in high speed because, if the distance L is too large, the time dependence of the repeated reflections of the input light signal between the layers superconductive material contributes to a degradation in the fidelity of the signal. Therefore, the maximum speed at which one operates the device is integrally connected to the separation of the reflectors. The applicants have found that the lowest extinction occurs when the optical path length between the layers of superconductive material is one quarter of the selected wavelength divided by the refractive index of the optical material between the layers of superconductive material.

Figure 4B:
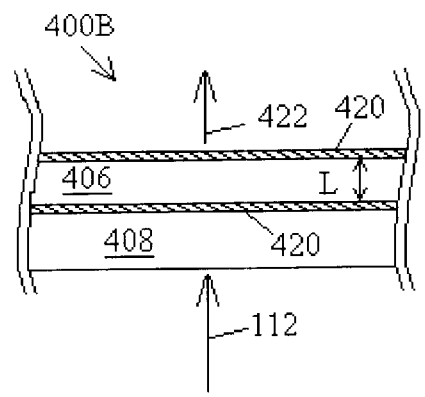

FIG. 4B illustrates an alternative embodiment of the etalon using superconductive layers as variable reflectors, generally indicated by the reference numeral 400B. Etalon 400B includes two layers of superconductive material 420 separated by medium 406. The layers of superconductive material and medium 406 are successively grown on substrate 408. Etalon 400B is advantageous in that only one substrate is needed to support the device and the two layers of superconductive material are more readily made parallel.

Figure 4C:
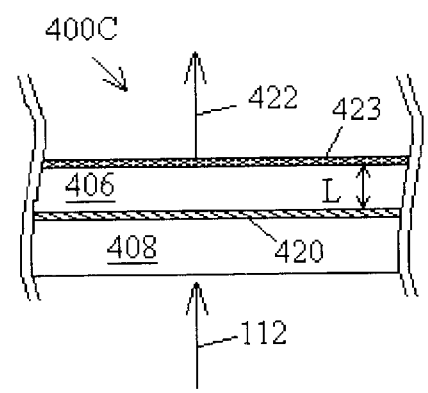

Still another alternative embodiment of the etalon is shown in FIG. 4C. An etalon 400C of FIG. 4C includes medium 406 and one layer of superconductive material 420 grown on substrate 408. Rather than a second layer of superconductive material, however, a highly reflective layer 423 is deposited on top of medium 406. Highly reflective layer 423 can be configured to have a reflectance of 99% or higher, thus enhancing the resonating properties of etalon 400C and further reducing the extinction ratio of etalon 400C. Such a high value of reflectance can be achieved using, for example, a noble metal, such as gold, or a dielectric mirror.

Figure 5A:
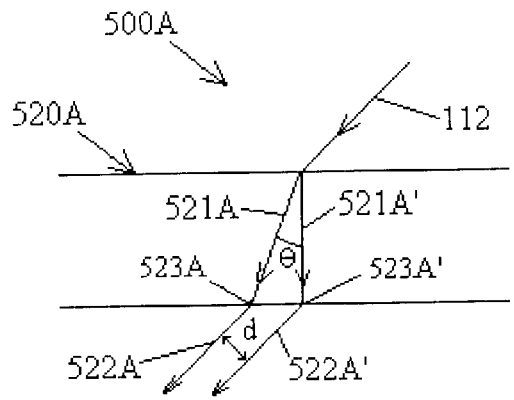
FIGS. 5A–C are diagrammatic illustrations of the mechanism of a further embodiment of an optical device with reduced extinction ratio designed in accordance with the present invention and employing an optical path shift technique.
Figure 5B:
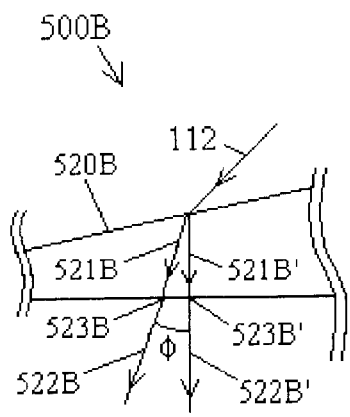

Attention is now directed to FIGS. 5A and 5B illustrating the mechanism of yet another embodiment of an optical device designed in accordance with the present invention, generally indicated by reference numerals 500A and 500B, respectively. FIGS. 5A and 5B illustrate ways in which the refractive index difference exhibited by the superconductive material between the superconducting and non-superconducting states can be used to direct incident light to physically separate paths such that the incident light is converted into modulated light.

In embodiment 500A of FIG. 5A, light 112 is incident upon a planar layer of superconductive material 520A. When superconductive material 520A is in the superconductive state, superconductive material 520A exhibits a first refractive index such that light 112 travels along a first light path 521A and emerges as a first light output 522A at a first spot 523A on an opposing surface of superconductive material 520A. When superconductive material 520A is switched to the non-superconducting state, superconductive material 520A exhibits a second refractive index such that light 112 travels along a different, second light path 521 A' and emerges as a second light output 522A' at a second spot 523A'. First light output 522A and second light output 522A' are parallel but separated by a distance d.

A mechanism similar to that of FIG. 5A is illustrated in FIG. 5B. In embodiment 500B of FIG. 5B, light 112 is incident upon a non-planar, wedge of superconductive material 520B. The wedge shape of superconductive material 520B can be achieved, for example, by an angled polishing or an angled etch process. When in the superconductive state, superconductive material 520B exhibits a first refractive index such that light 112 travels along a first light path 521B and emerges as a first light output 522B at a first spot 523B on an opposing surface of superconductive material 520B. When superconductive material 520B is switched to the non-superconducting state, superconductive material 520B exhibits a second refractive index such that light 112 travels along a different, second light path 521B' and emerges as a second light output 522B' at a second spot 523B'. First light output 522B and second light output 522B' emerge from the opposing surface of superconductive material 520B as angularly divergent beams with an angular difference φ, as shown in FIG. 5B.

Figure 5C:
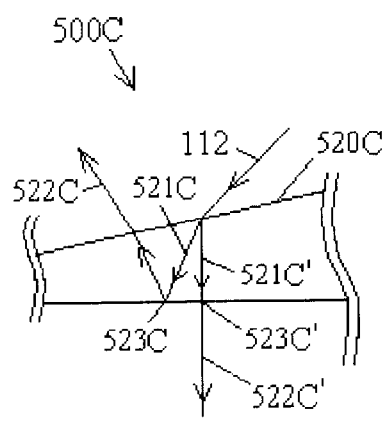

A variation of embodiment 500B of FIG. 5B is shown in FIG. 5C. In FIG. 5C, light 112 is incident upon a wedge of superconductive material 520C. Superconductive material 520C is configured such that, when in the superconducting state, superconductive material 520C exhibits a first refractive index such that light 112 travels along a first light path 521C. Furthermore, first light path 521C is such that light 112 is substantially reflected at first spot 523C by total internal reflection, and the reflected light emerges from the wedge as light output 522C, as shown in FIG. 5C. In this way, no light emerges from the wedge of superconductive material at first spot 523C when superconductive material 520C is in the superconducting state. When superconductive material 520C is in the non-superconducting state, superconductive material 520C exhibits a second refractive index such that light 112 travels along a different, second light path 521C' and emerges as a second light output 522C' at a second spot 523C'. First light output 522C and second light output 522C' emerge from the wedge of superconductive material 520C at different surfaces, as shown in FIG. 5C. In this way, the light outputs are physically separated depending on whether the superconductive material is in the superconducting state or the non-superconducting state.

Figure 6A:
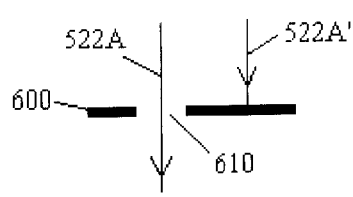
FIGS. 6A–G are diagrammatic illustrations of arrangements for distinguishing between two states of the modulated light produced by the embodiments illustrated in FIGS. 5A–B.

Referring now to FIGS. 6A–6F in conjunction with FIGS. 5A and 5B, the physical separation of the light outputs produced, depending on whether the superconductive material is in the superconducting or the non-superconducting state, can be used in various applications. FIG. 6A shows an implementation of an optical switch using the mechanism illustrated in FIG. 5A. A selective beam block 600 is positioned in the path of first light output 522A and second light output 522A'. Selective beam block 600 is configured such that first light output 522A is transmitted substantially unaltered therethrough while second light output 522A' is blocked. In this way, light is transmitted through selective beam block 600 when superconductive material 520A is in the superconductive state, while essentially no light is transmitted when superconductive material 520A is in the non-superconductive state. By effective blocking of second light output 522A' (i.e., resulting in a null signal) when the superconductive material is in the non-superconducting state and transmitting only first light output 522A, the combination of selective beam block 600 with the planar layer of superconductive material of FIG. 5A operates as an optical switch. By rapidly switching the superconductive material between the superconducting and non-superconducting states, the combination of selective beam block 600 with the planar layer of superconductive material also operates as a light modulator with a low extinction ratio.

Figure 6B:
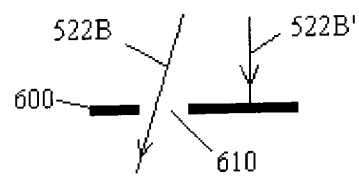

FIG. 6B illustrates a similar implementation of an optical switch/light modulator using a combination of selective beam block 600 with the wedge of superconductive material of FIG. 5B. Again by selectively blocking second light output 522B' while second light output 522B' when the superconductive material is in the non-superconducting state and transmitting only first light output 522B, the combination of selective beam block 600 with the wedge of superconductive material of FIG. 5B operates as an optical switch or, with rapid switching of the superconductive material between the superconducting and non-superconducting states, a light modulator with a low extinction ratio.

Figure 6C:
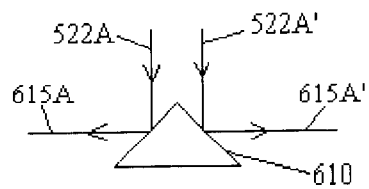
Figure 6D:
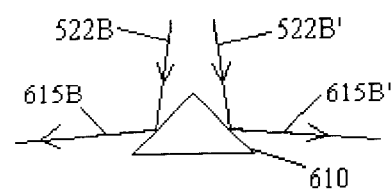

FIGS. 6C and 6D show the use of a prism 610 to further separate the first and second light output of FIGS. 5A and 5B. In both the parallel light output and angularly divergent light output cases shown in FIGS. 5A and 5B, respectively, the light outputs can be further separated by directing the light outputs to a refractive medium such as prism 610 to send each beam in a different direction. In this way, light from superconductive material 520A of FIG. 5A is directed in a direction indicated by arrow 615A, when the superconductive material is in the superconducting state, while light from superconductive material 520A is directed in a direction indicated by arrow 615A', when the superconductive material is in the non-superconducting state. Thus, the combination of prism 610 with the planar layer of superconductive material can be used for demultiplexing of light 112 such that the demultiplexed optical signals are detectable at physically separate locations. The combination of prism 610 in FIG. 6D with the wedge of superconductive material of FIG. 5B operates as a demultiplexer in a similar manner to the aforementioned planar layer of superconductive material with the prism.

Figure 6E:
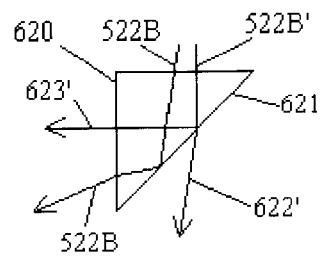

In the case of the angularly divergent light outputs produced by the wedge of superconductive material in FIG. 5B, dielectric materials can be used to distinguish between the two light outputs. For example, as shown in FIG. 6E, first light output 522B and second light output 522B' are incident on a dielectric wedge 620. First light output 522B is internally incident on a sloped surface 621 of dielectric wedge 620 at an angle equal to or larger than the critical angle such that substantially all of first light output 522B is internally reflected by sloped surface 621. In other words, dielectric wedge 620 simply redirects first light output 522B in a new direction. Due to the angular divergence caused by the wedge of superconductive material of FIG. 5B, however, second light output 522B' is incident on sloped surface 621 at an angle less than the critical angle. Therefore, second light output 522B' will be split upon incidence on sloped surface 621 into a transmitted component 622' and a reflected component 623'. In this way, a portion of second light output 522B' will be directionally isolated as transmitted component 622'. In addition, dielectric wedge 620 can be configured such that reflected, first light output 522B exits from dielectric wedge 620 at a different angle than reflected component 623' of second light output 522B', thus further enhancing the angular divergence effect initiated by wedge of superconductive material 520B of FIG. 5B.

Figure 6F:
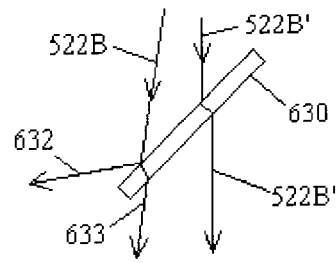

As another example of the use of dielectric materials to distinguish between two angularly divergent light outputs produced by wedge of superconductive material 520B of FIG. 5B, FIG. 6F shows a Brewster plate 630 positioned to intercept both first light output 522B and second light output 522B'. Brewster plate 630 is oriented with respect to the first and second light outputs such that Brewster plate 630 essentially operates as a beam splitter of first light output 522B, splitting first light output 522B into a reflected component 632 and a transmitted component 633. Second light output 522B', however, is incident on Brewster plate 630 at Brewster's angle such that substantially all of second light output 522B' is transmitted through Brewster plate 630, and essentially none of second light output 522B' is reflected by Brewster plate 630. In this way, a portion of first light output 522B is isolated as reflected light 632. Brewster plate 630 can also be configured such that transmitted component 633 of first light output 522B exits from Brewster plate 630 at a different angle than transmitted, second light output 522B', thus further enhancing the angular divergence effected by the wedge of superconductive material of FIG. 5B.

Figure 6G:
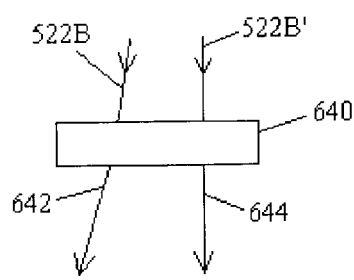

Suitable anisotropic materials can also be used in collaboration with the angularly divergent light outputs produced by wedge of superconductive material 520B of FIG. 5B. FIG. 6G illustrates a possible use of an anisotropic crystal 640 in conjunction with the angularly divergent, first light output 522B and second light output 522B'. In one application, since anisotropic materials affect the polarization state of incident light differently depending on the angle of incidence, anisotropic crystal 640 can be configured to change the polarization state of first light output 522B differently from second light output 522B'. In this way, first light output 522B and second light output 522B' are converted to a first light beam 642 and a second light beam 644, respectively, such that the first and second light beams are in different polarization states. First light beam 642 and second light beam 644 are then distinguished by using polarization dependent optics (not shown) such as polarizing beam splitters and Wollaston prisms.

It is noted that, in addition to modulating a continuous wave input light to produce a modulated light signal, the mechanisms illustrated in FIGS. 5A, 5B and 6A–G can be used to route an optical signal to different physical locations depending on the state of the superconductive material. For example, referring to FIG. 6C in conjunction with FIG. 5A, prism 610 can be used to direct the separated light outputs 615A and 615A' to different output ports for reception by different receivers. If the original input signal (light 112 in FIG. 5A) is a digital optical signal containing data, portions of that digital optical signal can be routed to different output ports by switching superconductive material 520A between the superconducting and non-superconducting states. Thus, the combination of superconductive material 520A, as shown in FIG. 5A, and prism 610, as shown in FIG. 6C, can be used as a router.

Figure 7:
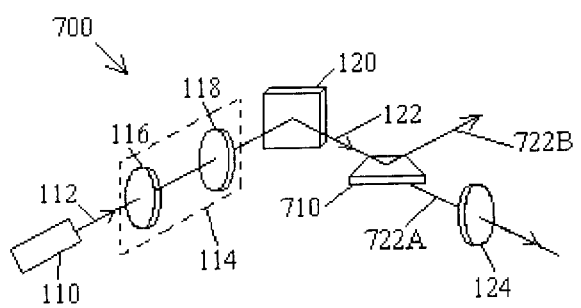
FIG. 7 is a diagrammatic illustration of an optical device with reduced extinction ratio designed in accordance with the present invention and using a Brewster angle technique.

In still another embodiment of the present invention shown in FIG. 7, generally indicated by the reference numeral 700, the refractive index change of superconductive materials between the superconducting and non-superconducting states is used to produce an optical switch for directing successive pulses of an optical serial data stream. Optical switch 700 of FIG. 7 is a modified form of light modulator 100 of FIGS. 2A and 2B with the addition of a dielectric plate 710, as will be discussed hereinafter.

Continuing to refer to FIG. 7, optical switch 700 includes light source 110 emitting light 112 into polarizing arrangement 114. As in light modulator 100 of FIGS. 2A and 2B, polarizing arrangement 114 includes polarizer 116 and compensator 118. Light 112, following transmission through polarizing arrangement 114, is directed onto a layer of superconductive material 120, which reflects light 112 as reflected light 122. Polarizing arrangement 114 is configured to cooperate with superconductive material 120 such that reflected light 122 is in a linear polarization state when superconductive material 120 is in the superconducting state, and reflected light 122 is in an elliptical polarization state when superconductive material 120 is in the non-superconducting state. This selective polarizing of reflected light 122 may be performed, for example, by orienting compensator 118 to counter the phase lag introduced in the reflected light upon reflection from superconductive material 120 when the superconductive material is in the superconducting state. Optical switch 700 further includes dielectric plate 710. A suitable material for use as dielectric plate 710 is, for example, z-cut quartz, which is compatible with wavelengths in the far-infrared. Dielectric plate 710 is positioned such that reflected light 122 is incident thereon at Brewster's angle. In this case, when superconductive material 120 is in the superconducting state, and reflected light 122 is in a linear polarization state, substantially all of reflected light 122 is transmitted through dielectric plate 710 as a transmitted signal 722A. However, when superconductive material 120 is in the non-superconducting state, and reflected light 122 is in an elliptical polarization state, only a part of reflected light 122 is transmitted through dielectric plate 710 as transmitted signal 722A while the remainder of reflected light 122 is reflected by dielectric plate 710 as reflected signal 722B. Transmitted signal 722A can be directed through analyzer 124 to eliminate any phase lag potentially introduced during transmission through dielectric plate 710.

Optical switch 700 of FIG. 7 allows one to pick off a part of reflected light 122 as reflected signal 722B by modulating superconductive material 120 between the superconducting and non-superconducting states. Optical switch 700 may be used, for example, as a light modulator by providing light 112 as a continuous wave signal, switching superconductive material 120 between the superconducting and non-superconducting states to encode optical data on light 112, and detecting transmitted signal 722B, which is zero or non-zero according to whether the superconductive material is in the non-superconducting state or the superconducting state, respectively. Thus, optical switch 700 is usable as a light modulator. In addition, by ensuring that reflected signal 722B is essentially zero when the superconductive material is in the non-superconducting state, the extinction ratio of optical switch 700 can be minimized. Alternatively, if light source 110 provides light 112 as a high speed, serial optical signal containing optical data, optical switch 700 can direct selected portions of reflected light 122, which contains the same optical data as light 112, to a different location or detection equipment. In this way, the optical data can be received by detectors incapable of operating at speeds comparable to the light modulator. As still another example, optical switch 700 can be used to alternately direct bits of an incoming optical data stream to two separate detectors. This configuration is advantageous because it allows the accommodation of optical signals at twice the data reception rate of the detectors.

Figure 8:
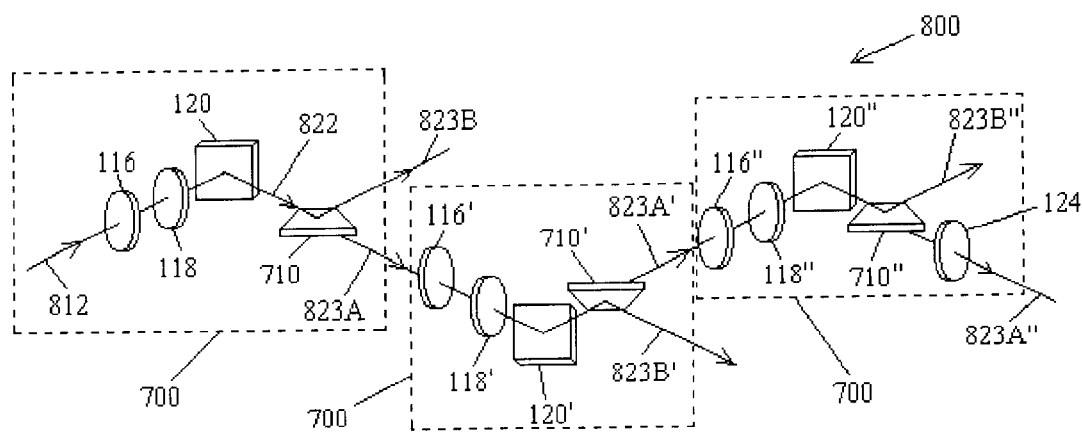
FIG. 8 is a diagrammatic illustration of a demultiplexer formed using a plurality of the optical device of FIG. 7 in succession.

A plurality of optical switches 700 of FIG. 7 can be used in optical demuliexing and multiplexing systems compatible with optical time division multiplexing (OTDM) and dense wave division multiplexing (DWDM). FIG. 8 shows a demultiplexer 800 formed of a plurality of optical switches 700 of FIG. 7 in succession. By chaining a plurality of optical switches 700, as illustrated in FIG. 8, it is possible to implement a switching arrangement capable of demultiplexing a fast signal such that receivers operating at many times lower bit rates than the actual optical signal can be used to detect high speed optical signals. In demultiplexer 800, an optical signal 812 is directed into a first optical switch including polarizer 116, compensator 118, superconductive material 120 and dielectric plate 710. Optical signal 812 is transmitted through polarizer 116 and compensator 118 then reflected off of superconductive material 120 as reflected light 822, in a manner analogous to optical switch 700. Dielectric plate 710 is configured to transmit therethrough most of reflected light 822 as transmitted light 823A, when superconductive material 120 is in the superconductive state, while reflecting a fraction of reflected light 822 as reflected signal 823B. Transmitted signal 823A then becomes the input for the next optical switch. The aforedescribed process can be repeated until the intensity of the transmitted signal becomes too weak such that data contained in the original optical signal 812 can no longer be distinguished. The extinction ratios of the reflected signals (823B, 823B', 823B", etc.) of demultiplexer 800 can be made to be essentially zero by proper selection of the polarizers, compensators, superconductive materials and dielectric plates. The signal strength of the reflected signals are determined by the amount of polarization modulation induced in light reflected from the superconductive material as well as by the material properties of the dielectric plates.

As described earlier in reference to FIGS. 5A, 5B and 6A–6G, the switching arrangement of FIG. 8 can also be used to route optical signals to different output ports. For example, the reflected signals (823B, 823B', 823B'', etc.) of demultiplexer 800 be directed to different output ports according to the state of the superconductive materials. Thus, portions of the optical signal 812 can be picked off and directed to different ports by using the demultiplexer 800 as a router.

Figure 9:
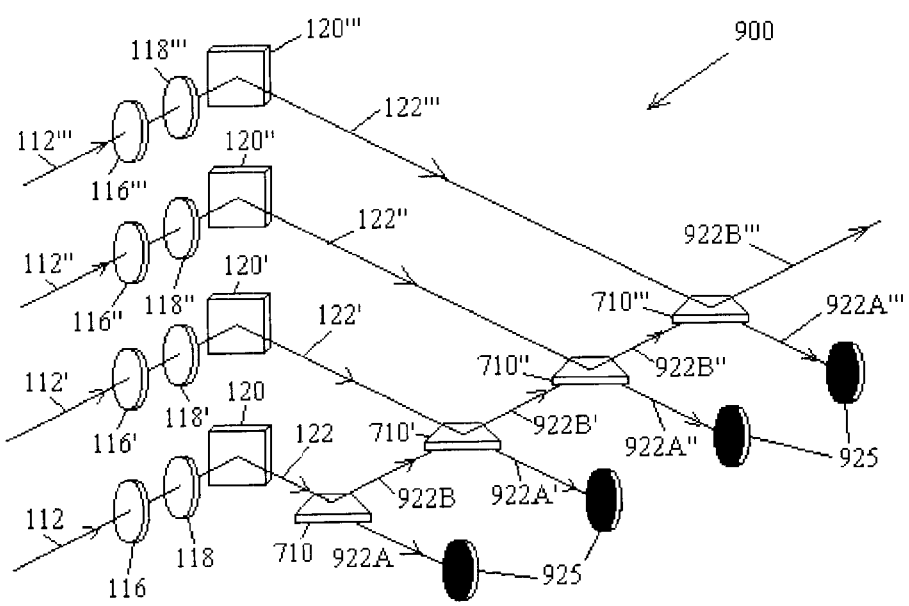
FIG. 9 is a diagrammatic illustration of a multiplexer formed using a parallel arrangement of a plurality of the optical device illustrated in FIG. 7.

A plurality of optical switches 700 of FIG. 7 can also be used in parallel to achieve a multiplexer. FIG. 9 illustrates an embodiment of a multiplexer 900 formed of a plurality of optical switches 700. In multiplexer 900, a plurality of optical switches are configured such that, when light 112, 112', 112'' and 112''' are directed through the optical switches, respectively, the optical switches respectively generate transmitted signals 922A, 922A', 922A'' and 922A''', when superconductive materials 120, 120', 120'' and 120''' are in their superconducting states, and reflecting a portion of reflected light 122, 122', 122'' and 122''', when superconductive materials 120, 120', 120'' and 120''' are in their non-superconducting states. Superconductive materials 120, 120', 120'' and 120''' can be designed to generate reflected light 122, 122', 122'' and 122''' of relatively slow bit rates. Alternatively, light 112, 112', 112 and 112''' can each have a unique wavelength. Transmitted signals 922A, 922A', 922A'' and 922A''' are transmitted through dielectric plates 710, 710', 710'' and 710''', respectively, and are absorbed by beam blocks 925. Reflected signal 922B is reflected by dielectric plate 710 toward dielectric plate 710' of the next optical switch to form an overall aligned light output path common to all of the optical switches. Dielectric plate 710' is configured to transmit reflected signal 922B therethrough while reflecting a portion of reflected light 122', when superconductive material 120' is in the non-superconducting state, such that reflected signal 922B' contains the reflected portion of reflected light 122' as well as reflected signal 922B from the previous optical switch. Similarly, dielectric plate 710'' allows reflected signal 922B' therethrough while reflecting a portion of reflected light 122'', when superconductive material 120'' is in the non-superconducting state, such that dielectric plate 710'' generates reflected signal 922B'' containing the reflected portion of reflected light 122'' as well as reflected signal 922B' from the previous optical switch. The aforedescribed process is repeated to generate a multiplexed signal in the light path output (922B''' as shown in FIG. 9) containing the reflected signals from the plurality of optical switches. If reflected light 112, 112', 112'' and 112''' are optical signals of low data rates, multiplexer 900 can be configured such that multiplexed signal 922B' is a high data rate signal combining all of the signals generated by the optical switches. Alternatively, if light 112, 112', 112'' and 112''' are optical signals with different wavelengths, multiplexed signal 922B' can be a wavelength division multiplexed signal containing all of the optical data generated by the plurality of optical switches. Multiplexer 900 is advantageous in that it produces a high data rate, multiplexed signal 922''' by combining the series of short, lower speed signals produced at each optical switch. Therefore, a plurality of lower speed data transmitters can be combined using a plurality of optical switches to produce a high data rate, combined signal. Alternatively, multiplexer 900 can be configured to combine optical signals by wavelength division multiplexing to produce multiplexed signal 922''' with high data content.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and are therefore regarded as falling within the scope of the present invention. For example, the layer of superconductive material as shown in the various figures may be used in transmission, rather than in reflection, and vice versa. Also, additional optical components, such as mirrors, lenses, nonlinear optical crystals, filters and optical fibers may be added to provide additional features such as beam control, wavelength conversion and light propagation. Therefore, the present examples are to be considered as illustrative and not restrictive, and the invention is not to be limited to the details given herein but may be modified within the scope of the appended claims.

What is claimed is:

1. An optical assembly for modulating input light and providing modulated light at an output thereof, said optical assembly comprising:

a) a first arrangement including a layer of a superconductive material having at least a part of said input light incident thereon as incident light, the superconductive material being switchable between a first state, in which the superconductive material exhibits a first refractive index, and a second state, in which the superconductive material exhibits a second refractive index, said first arrangement being configured to direct to the output as said modulated light a first fraction of the incident light, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output; and b) a second arrangement cooperating with said first arrangement to provide at the output of the optical assembly another value of said extinction ratio that is smaller than said given value.

2. The optical assembly of claim 1 wherein the superconductive material is used in a transmissive configuration.

3. The optical assembly of claim 1 wherein the superconductive material is used in a reflective configuration.

4. The optical assembly of claim 1 wherein the superconductive material is configured to selectively modulate the incident light such that the superconductive material, when in said first state, sets said modulated light to a first polarization state, and, when in said second state, sets said modulated light to a second polarization state, and wherein said second arrangement includes i) a polarizing arrangement for setting said input light to a known, initial polarization state, and ii) an analyzer configured to receive said modulated light and to selectively absorb substantially all of the modulated light of said first polarization state while transmitting at least a portion of the modulated light of said second polarization state therethrough.

5. The optical assembly of claim 4 wherein said polarizing arrangement includes a polarizer.

6. The optical assembly of claim 5 wherein said polarizing arrangement further includes a compensator.

7. The optical assembly of claim 4 wherein said first state is a superconducting state.

8. The optical assembly of claim 4 wherein said second state is a non-superconducting state.

9. The optical assembly of claim 1 wherein the superconductive material is configured to selectively modulate the incident light such that the superconductive material, when in said first state, sets said modulated light to a first polarization state, and, when in said second state, sets said modulated light to a second polarization state, and wherein said second arrangement includes i) a polarizing arrangement for setting said input light to a known, initial polarization state, and ii) an analyzer configured to receive said modulated light and to selectively reflect substantially all of the modulated light of said first polarization state while transmitting at least a portion of the modulated light of said second polarization state therethrough.

10. The optical assembly of claim 9 wherein said polarizing arrangement includes a polarizer.

11. The optical assembly of claim 10 wherein said polarizing arrangement further includes a compensator.

12. The optical assembly of claim 9 wherein said first state is a superconducting state.

13. The optical assembly of claim 4 wherein said second state is a non-superconducting state.

14. The optical assembly of claim 1 wherein said input light has a predetermined wavelength, and wherein said second arrangement includes i) a light splitting arrangement for splitting said input light into at least a first light portion, to be used as the incident light, and a second light portion and for thereafter directing said first light portion along a first light path through the superconductive material and directing said second light portion along a distinct, second light path, ii) a first configuration for acting on the first light portion in a first predetermined way, iii) a second configuration for acting on the second light portion in a second predetermined way, and iv) a combining arrangement for combining the first and second fractions of the incident light with at least a part of the second light portion into a combined signal at an intersection point of said first and second light paths and for thereafter directing said combined signal to the output, said combining arrangement cooperating with said first and second configurations such that, when the superconductive material is in said first state, said first fraction of the incident light and said part of the second light portion destructively interfere to result in said combined signal being substantially zero and, when the superconductive material is in said second state, said combined signal is non-zero.

15. The optical assembly of claim 14 wherein said first configuration includes a first reflector positioned in said first light path for directing said first light portion to the intersection point.

16. The optical assembly of claim 14 wherein said second configuration includes a second reflector positioned in said second light path for directing said second light portion to the intersection point.

17. The optical assembly of claim 14 wherein said second configuration includes an attenuator positioned in said second light path configured to attenuate said second light portion such that an attenuated, second light portion matches said first fraction of said first light portion in intensity.

18. The optical assembly of claim 14 wherein a first path length and a second path length are defined as distances between said splitting arrangement and said intersection point along said first light path and second light path, respectively, and wherein said first and second light paths are configured such that said first and second path lengths differ by an odd integer multiple of one half of said predetermined wavelength.

19. The optical assembly of claim 14 wherein said first state is a superconducting state.

20. The optical assembly of claim 14 wherein said second state is a non-superconducting state.

21. The optical assembly of claim 14 wherein said light splitting arrangement includes a beam splitter.

22. The optical assembly of claim 14 wherein said light splitting arrangement includes a wavefront splitter.

23. The optical assembly of claim 22 wherein said light splitting arrangement includes a plurality of said wavefront splitters.

24. The optical assembly of claim 23 wherein said plurality of said wavefront splitters is in a form of a transmissive grating.

25. The optical assembly of claim 23 wherein said plurality of said wavefront splitters is in a form of a reflective grating.

26. The optical assembly of claim 1 wherein the incident light has a particular wavelength, wherein the superconductive material exhibits a first reflectance in said first state and a second reflectance in said second state, and wherein said second arrangement includes a reflective surface positioned substantially parallel to and spaced apart from said layer of a superconductive material such that said reflective surface cooperates with said layer of the superconductive material to form an etalon, said etalon being configured to block substantially all of the incident light of said particular wavelength, when the superconductive material is in said first state, and to direct the incident light of said particular wavelength to the output, when the superconductive material is in said second state.

27. The optical assembly of claim 26 wherein said reflective surface includes an additional layer of the superconductive material.

28. The optical assembly of claim 26 wherein said reflective surface is a high reflector, said high reflector being designed to reflect substantially all light incident thereon in a predetermined range about said particular wavelength.

29. The optical assembly of claim 26 wherein said etalon is a Fabry-Perot etalon.

30. The optical assembly of claim 26 wherein said second arrangement further includes an optical material positioned between said reflective surface and said layer of the superconductive material.

31. The optical assembly of claim 1 wherein the superconductive material is configured such that the incident light, which is incident on a surface of said layer of the superconductive material, emerges as said modulated light at a first spot on an opposite surface of said layer of the superconductive material in said first state, and at a distinct, second spot on said opposite surface of said layer of the superconductive material in said second state, and wherein said second arrangement includes a light directing arrangement for directing said modulated light to the output.

32. The optical assembly of claim 31 wherein said second arrangement further includes a beam block for selectively blocking said modulated light emerging at said second spot while allowing said modulated light emerging at said first spot to be transmitted substantially unaltered therethrough.

33. The optical assembly of claim 31 wherein said light directing arrangement is configured to direct said modulated light emerging at said first spot in a first direction and to direct said modulated light emerging at said second spot in a distinct, second direction.

34. The optical assembly of claim 33 wherein said light directing arrangement includes a prism for further spatially separating said modulated light emerging at said first spot from said modulated light emerging at said second spot.

35. The optical assembly of claim 33 wherein said light directing arrangement includes a dielectric wedge oriented such that said modulated light emerging at said first spot is incident on a surface of said dielectric wedge at Brewster's angle.

36. The optical assembly of claim 33 wherein said light directing arrangement includes a Brewster plate oriented such that modulated light emerging at said first spot is incident on a surface of said Brewster plate at Brewster's angle.

37. The optical assembly of claim 31 wherein said modulated light has a given polarization state, and wherein said light directing arrangement includes an anisotropic crystal for selectively altering said polarization state of said modulated light such that said modulated light emerging at said first spot is in a first polarization state and said modulated light emerging at said second spot is in a distinct, second polarization state.

38. The optical assembly of claim 31 wherein said layer of the superconductive material is configured as a plane parallel plate.

39. The optical assembly of claim 31 wherein said layer of the superconductive material is configured as a wedge.

40. The optical assembly of claim 31 wherein the incident light is directed onto said surface of said layer of the superconductive material at an angle away from a surface normal of said surface.

41. The optical assembly of claim 1 wherein the superconductive material is configured to reflect the incident light such that the superconductive material, when in said first state, produces said modulated light with a first phase lag and, when in said second state, produces said modulated light with a second phase lag, and wherein said second arrangement includes
  i) a polarizing arrangement for setting said input light in a known, initial polarization state,
  ii) a compensator configured to compensate for said first phase lag such that, after being acted upon by said compensator, said modulated light is linearly polarized when the superconductive material is in said first state, while said modulated light is elliptically polarized when the superconductive material is in said second state, and
  iii) a directing configuration including a directing arrangement and a dielectric plate, said directing arrangement being configured to direct said modulated light to the dielectric plate, said dielectric plate being oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output.

42. The optical assembly of claim 41 wherein said polarizing arrangement includes a linear polarizer.

43. The optical assembly of claim 41 further comprising an analyzer through which said modulated light is directed for setting said modulated light to a desired polarization state.

44. The optical assembly of claim 41 wherein said optical assembly is configured to function as an optical switch, said optical switch being switchable between an OFF state, in which said modulated light is transmitted through said dielectric plate when the superconductive material is in said first state such that essentially no optical energy reaches the output, and an ON state, in which said portion of said modulated light is redirected to the output when the superconductive material is in said second state.

45. An optical demultiplexer having an output and comprising a plurality of optical assemblies in series, each one of said plurality of optical assemblies being configured for modulating input light and providing modulated light at the output, each one of said plurality of optical assemblies including:
  a) a first arrangement including a layer of a superconductive material having at least a part of said input light incident thereon as incident light, the superconductive material being switchable between a first state, in which the superconductive material exhibits a first refractive index, and a second state, in which the superconductive material exhibits a second refractive index, said first arrangement being configured to direct as said modulated light a first fraction of the incident light to the output of the optical demultiplexer, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output of the optical demultiplexer, said superconductive material being configured to reflect the incident light such that the superconductive material, when in said first state, produces said modulated light with a first phase lag and, when in said second state, produces said modulated light with a second phase lag; and
  b) a second arrangement cooperating with said first arrangement to provide at the output of the optical demultiplexer another value of said extinction ratio that is smaller than said given value, said second arrangement including:
    i) a polarizing arrangement for setting said input light in a known, initial polarization state,
    ii) a compensator configured to compensate for said first phase lag such that, after being acted upon by said compensator, said modulated light is linearly polarized when the superconductive material is in said first state, while said modulated light is elliptically polarized when the superconductive material is in said second state, and
    iii) a directing configuration including a directing arrangement and a dielectric plate, said directing arrangement being configured to direct said modulated light to the dielectric plate, said dielectric plate being oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output of the optical demultiplexer, said plurality of optical assemblies being configured such that, when the superconductive material of a given one of said plurality of optical assemblies is in said first state, the modulated light of the given one of said plurality of optical assemblies, following transmission through said dielectric plate, becomes the input light for a next one of said optical assemblies in said series.

46. The optical demultiplexer of claim 45 wherein, when the superconductive material of said next one of said plurality of optical assemblies is in said second state, said dielectric plate of said next one of said plurality optical assemblies reflects another portion of said modulated light to the output of the optical demultiplexer.

47. The optical demultiplexer of claim 46, said optical demultiplexer having an additional output, wherein the dielectric plate of said next one of said plurality of optical assemblies reflects said another portion of said modulated light to the additional output of the optical demultiplexer.

48. An optical multiplexer having an output and comprising a plurality of optical assemblies in parallel, each one of said plurality of optical assemblies being configured for modulating input light and providing modulated light at the output, each one of said plurality of optical assemblies including:

a) a first arrangement including a layer of a superconductive material having at least a part of said input light incident thereon as incident light, the superconductive material being switchable between a first state, in which the superconductive material exhibits a first refractive index, and a second state, in which the superconductive material exhibits a second refractive index, said first arrangement being configured to direct as said modulated light a first fraction of the incident light to the output of the optical multiplexer, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output of the optical multiplexer, said superconductive material being configured to reflect the incident light such that the superconductive material, when in said first state, produces said modulated light with a first phase lag and, when in said second state, produces said modulated light with a second phase lag; and b) a second arrangement cooperating with said first arrangement to provide at the output of the optical multiplexer another value of said extinction ratio that is smaller than said given value, said second arrangement including:

i) a polarizing arrangement for setting said input light in a known, initial polarization state, ii) a compensator configured to compensate for said first phase lag such that, after being acted upon by said compensator, said modulated light is linearly polarized when the superconductive material is in said first state, while said modulated light is elliptically polarized when the superconductive material is in said second state, and iii) a directing configuration including a directing arrangement and a dielectric plate, said directing arrangement being configured to direct said modulated light to the dielectric plate, said dielectric plate being oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output of the optical multiplexer, said plurality of optical assemblies being configured such that, when the superconductive material of a given one of said plurality of optical assemblies is in said first state, the modulated light of the given one of said plurality of optical assemblies, following transmission through said dielectric plate, is absorbed by a beam block while, when the superconductive material of the given one of said plurality of optical assemblies is in said second state, said portion of the modulated light of the given one of said plurality of optical assemblies is transmitted through said dielectric plate of a next one of said plurality of optical assemblies to be combined with said portion of the modulated light of the next one of the plurality of optical assemblies and directed to the output of the optical multiplexer.

49. An optical assembly for modulating input light and providing modulated light at an output thereof, said optical assembly comprising:

a) means for modulating said input light, said modulating means including a layer of a superconductive material having at least a part of said input light incident thereon as incident light, the superconductive material being switchable between a first state, in which the superconductive material exhibits a first refractive index, and a second state, in which the superconductive material exhibits a second refractive index, said modulating means being configured to direct to the output as said modulated light a first fraction of the incident light, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output; and b) means for acting on at least one of said input light and said first and second fractions of said incident light to provide at the output of the optical assembly another value of said extinction ratio that is smaller than said given value.

50. The optical assembly of claim 49 wherein the superconductive material is configured to selectively modulate the incident light such that the superconductive material, when in said first state, sets said modulated light to a first polarization state, and, when in said second state, sets said modulated light to a second polarization state, and wherein said acting means includes i) means for setting said input light in a known, initial polarization state, and ii) means for selectively absorbing substantially all of the modulated light of said first polarization state while transmitting at least a portion of the modulated light of said second polarization state.

51. The optical assembly of claim 49 wherein the superconductive materas configured to selectively modulate the incident light such that the superconductive material, when in said first state, sets said modulated light to a first polarization state, and, when in said second state, sets said modulated light to a second polarization state, and wherein said acting means includes i) means for setting said input light in a known, initial polarization state, and ii) means for selectively reflecting substantially all of the modulated light of said first polarization state while transmitting at least a portion of the modulated light of said second polarization state.

52. The optical assembly of claim 49 wherein said input light has a predetermined wavelength and wherein said acting means includes i) means for splitting said input light into at least a first light portion, to be used as the incident light, and a second light portion and for thereafter directing said first light portion along a first light path through the superconductive material and directing said second light portion along a distinct, second light path, ii) means for acting on said first light portion in a first predetermined way, iii) means for acting on said second light portion in a second predetermined way, and iv) means for combining the first light portion with at least a part of the second light portion into a combined signal at an intersection point of said first and second light paths and for thereafter directing said combined signal to the output, said combining means cooperating with said means for acting on said first light portion and said means for acting on said second light portion such that, when the superconductive material is in said first state, said first fraction of said first light portion and said part of the second light portion destructively interfere resulting in said combined signal being substantially zero and, when the superconductive material is in said second state, said combined signal is non-zero.

53. The optical assembly of claim 52 wherein a first path length and a second path length are defined as distances between said splitting means and said intersection point along said first light path and second light path, respectively, and wherein said first and second light paths are configured such that said first and second path lengths differ by an odd integer multiple of one half of said predetermined wavelength.

54. The optical assembly of claim 49 wherein the incident light has a particular wavelength, wherein the superconductive material exhibits a first reflectance in said first state and a second reflectance in said second state, and wherein said acting means includes a reflective surface positioned substantially parallel to and spaced apart from said layer of the superconductive material such that said reflective surface cooperates with said layer of the superconductive material cooperate to form an etalon, said etalon being configured to absorb substantially all of the incident light of said particular wavelength, when the superconductive material is in said first state, and to direct the incident light of said particular wavelength to the output, when the superconductive material is in said second state.

55. The optical assembly of claim 49 wherein the superconductive material is configured such that at least a portion of the incident light, incident on a surface of said layer of the superconductive material, emerges as said modulated light at a first spot on an opposite surface of said layer of the superconductive material in said first state and at a distinct, second spot on said opposite surface of said layer of the superconductive material in said second state, and wherein said acting means includes means for directing said modulated light to the output.

56. The optical assembly of claim 55 wherein said acting means further includes means for selectively blocking the modulated light at said second spot while allowing the modulated light at said first spot to be transmitted substantially unaltered therethrough.

57. The optical assembly of claim 56 wherein said directing means is configured to direct said modulated light emerging at said first spot in a first direction and to direct said modulated light emerging at said second spot in a distinct, second direction.

58. The optical assembly of claim 49 wherein the superconductive material is configured to reflect the incident light such that the superconductive material, when in said first state, produces said modulated light with a first phase lag and, when in said second state, produces said modulated light with a second phase lag, and wherein said acting means includes i) means for setting said input light in a known, initial polarization state, ii) means for compensating for said first phase lag such that, after being acted upon by said compensating means, said modulated light is linearly polarized when the superconductive material is in said first state, while said modulated light is elliptically polarized when the superconductive material is in said second state, and iii) means for selectively directing said modulated light, said selective directing means including a directing arrangement and a dielectric plate, and said directing arrangement being configured to direct said modulated light to the dielectric plate, which dielectric plate is oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output.

59. The optical assembly of claim 58 wherein said optical assembly is configured to function as an optical switch, said optical switch being switchable between an OFF state, in which said modulated light is transmitted through said dielectric plate when the superconductive material is in said first state such that essentially no optical energy reaches the output, and an ON state, in which said portion of said modulated light is diverted to the output when the superconductive material is in said second state.

60. An optical demultiplexer having an output and comprising a plurality of optical assemblies in series, each one of said plurality of optical assemblies being configured for modulating input light and providing modulated light at the output, each one of said plurality of optical assemblies including:

a) means for modulating said input light, said modulating means including a layer of a superconductive material having at least a part of said input light incident thereon as incident light, the superconductive material being switchable between a first state, in which the superconductive material exhibits a first refractive index, and a second state, in which the superconductive material exhibits a second refractive index, said modulating means being configured to direct as said modulated light a first fraction of the incident light to the output of the optical demultiplexer, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output of the optical demultiplexer, said superconductive material being configured to reflect the incident light such that the superconductive material, when in said first state, produces said modulated light with a first phase lag and, when in said second state, produces said modulated light with a second phase lag; and b) means for acting on at least one of said input light and said first and second fractions of said incident light to provide at the output of the optical demultiplexer another value of said extinction ratio that is smaller than said given value, said second arrangement including:

i) means for setting said input light in a known, initial polarization state, ii) means for compensating for said first phase lag such that, after being acted upon by said compensating means, said modulated light is linearly polarized when the superconductive material is in said first state, while said modulated light is elliptically polarized when the superconductive material is in said second state, and iii) means for selectively directing said modulated light, said selective directing means including a directing arrangement and a dielectric plate, said directing arrangement being configured to direct said modulated light to the dielectric plate, said dielectric plate being oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output of the optical demultiplexer, said plurality of optical assemblies being configured such that, when the superconductive material of a given one of said plurality of optical assemblies is in said first state, the modulated light of the given one of said plurality of optical assemblies, following transmission through said dielectric plate, becomes the input light for a next one of said optical assemblies in said series.

61. The optical demultiplexer of claim 60 wherein, when the superconductive material of said next one of said plurality of optical assemblies is in said second state, said dielectric plate of said next one of said plurality of optical assemblies reflects another portion of said modulated light to the output of the optical demultiplexer.

62. The optical demultiplexer of claim 60, said optical demultiplexer having an additional output, wherein the dielectric plate of said next one of said plurality of optical assemblies reflects said another portion of said modulated light to the additional output of the optical demultiplexer.

63. An optical multiplexer having an output and comprising a plurality of optical assemblies in parallel, each one of said plurality of optical assemblies being configured for modulating input light and providing modulated light at the output, each one of said plurality of optical assemblies including:

a) means for modulating said input light, said modulating means including a layer of a superconductive material having at least a part of said input light incident thereon as incident light, the superconductive material being switchable between a first state, in which the superconductive material exhibits a first refractive index, and a second state, in which the superconductive material exhibits a second refractive index, said modulating means being configured to direct as said modulated light a first fraction of the incident light to the output of the optical multiplexer, when the superconductive material is in said first state, and a second fraction of the incident light, when the superconductive material is in said second state, such that said modulated light exhibits a given value of extinction ratio, said extinction ratio being defined as a ratio of said first fraction of the incident light to said second fraction of the incident light at the output of the optical multiplexer, said superconductive material being configured to reflect the incident light such that the superconductive material, when in said first state, produces said modulated light with a first phase lag and, when in said second state, produces said modulated light with a second phase lag; and b) means for acting on at least one of said input light and said first and second fractions of said incident light to provide at the output of the optical multiplexer another value of said extinction ratio that is smaller than said given value, said second arrangement including:

i) means for setting said input light in a known, initial polarization state, ii) means for compensating for said first phase lag such that, after being acted upon by said compensating means, said modulated light is linearly polarized when the superconductive material is in said first state, while said modulated light is elliptically polarized when the superconductive material is in said second state, and iii) means for selectively directing light, said selective directing means including a directing arrangement and a dielectric plate, said directing arrangement being configured to direct said modulated light to the dielectric plate, said dielectric plate being oriented such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is directed by said dielectric plate to the output of the optical multiplexer, said plurality of optical assemblies being configured such that, when the superconductive material of a given one of said plurality of optical assemblies is in said first state, the modulated light of the given one of said plurality of optical assemblies, following transmission through said dielectric plate, is absorbed by a beam block while, when the superconductive material of the given one of said plurality of optical assemblies is in said second state, said portion of the modulated light of the given one of said plurality of optical assemblies is transmitted through said dielectric plate of a next one of said plurality of optical assemblies to be combined with said portion of the modulated light of the next one of the plurality of optical assemblies and directed to the output of the optical multiplexer.

64. A method for modulating input light and providing modulated light at an output, said method comprising the steps of:
a) directing at least a part of the input light as incident light at a layer of a superconductive material, the superconductive material being switchable between a first state, in which the superconductive material exhibits a first refractive index, and a second state, in which the superconductive material exhibits a second refractive index;
b) arranging the superconductive material such that, when the superconductive material is in said first state, a first fraction of the incident light is directed to the output as modulated light and, when the superconductive material is in said second state, a second fraction of the incident light is directed to the output as modulated light, said modulated light having a given value of extinction ratio, said extinction ratio being defined as a ratio of said first fraction of the incident light to said second fraction of the incident light at the output; and
c) acting on at least one of said input light and said first and second fractions of incident light so as to provide at the output another value of said extinction ratio that is smaller than said given value.

65. The method of claim 64 wherein said arranging step includes the step of using the superconductive material in a transmissive configuration.

66. The method of claim 64 wherein said arranging step includes the step of using the superconductive material in a reflective configuration.

67. The method of claim 64 wherein said arranging step includes the step of configuring the superconductive material to selectively modulate said incident light such that the superconductive material, when in said first state, sets the modulated light to a first polarization state, and, when the superconductive material is in said second state, sets the modulated light to a second polarization state, and wherein said acting step includes the steps of:
i) setting said input light in a known, initial polarization state,
ii) selectively absorbing substantially all of the modulated light of said first polarization state, and
iii) directing at least a portion of the modulated light of said second polarization state to the output.

68. The method of claim 64 wherein said arranging step includes the step of configuring the superconductive material to selectively modulate said incident light such that the superconductive material, when in said first state, sets the modulated light to a first polarization state, and, when the superconductive material is in said second state, sets the modulated light to a second polarization state, and wherein said acting step includes the steps of:
i) setting said input light in a known, initial polarization state,
ii) selectively reflecting substantially all of the modulated light of said first polarization state, and
iii) directing at least a portion of the modulated light of said second polarization state to the output.

69. The method of claim 64 wherein the input light has a predetermined wavelength, and wherein said acting step includes the steps of:
i) splitting the input light at a splitting point into at least a first light portion, to be used as the incident light, and a second light portion,
ii) directing said first light portion along a first light path through the superconductive material,
iii) directing said second light portion along a distinct, second light path,
iv) acting on the first light portion in a first predetermined way,
v) acting on the second light portion in a second predetermined way,
vi) combining the first light portion with at least a portion of the second light portion into a combined signal at an intersection point of said first and second light paths, and
vii) directing said combined signal to the output, said first and second light paths cooperating such that, when the superconductive material is in said first state, said first fraction of said first light portion and said second light portion destructively interfere to result in said combined signal being substantially zero and, when the superconductive material is in said second state, said combined signal is non-zero.

70. The method of claim 69 wherein a first path length and a second path length are defined as distances between said splitting point and said intersection point along said first light path and said second light path, respectively, and wherein said acting step further includes the step of adjusting said first and second light paths such that said first and second path lengths differ by an odd integer multiple of one half of said predetermined wavelength.

71. The method of claim 69 wherein said splitting step includes the step of using a beam splitter.

72. The method of claim 69 wherein said splitting step includes the step of using a wavefront splitter.

73. The method of claim 72 wherein said splitting step includes the step of using a plurality of said wavefront splitters.

74. The method of claim 73 wherein said step of using said plurality of wavefront splitters includes the step of using a transmissive grating.

75. The method of claim 73 wherein said step of using said plurality of wavefront splitters includes the step of using a reflective grating.

76. The method of claim 64 wherein the incident light has a particular wavelength, wherein said arranging step includes the step of configuring said superconductive material to exhibit a first reflectance in said first state and a second reflectance in said second state, and wherein said acting step includes the steps of:
i) positioning a reflective surface substantially parallel to and spaced apart from said layer of the superconductive material such that said reflective surface cooperates with said layer of the superconductive material to form an etalon, and
ii) configuring said etalon to block substantially all of said light of said particular wavelength, when the superconductive material is in said first state, and to direct said light of said particular wavelength to the output, when the superconductive material is in said second state.

77. The method of claim 76 wherein said acting step further includes the step of incorporating an additional layer of the superconductive material in said reflective surface.

78. The method of claim 76 wherein said acting step further includes the steps of
i) providing a high reflector as said reflective surface, and
ii) configuring said high reflector to reflect substantially all light in a predetermined range about said particular wavelength.

79. The method of claim 76 wherein said acting step further includes the step of positioning an optical material between said reflective surface and said layer of the superconductive material.

80. The method of claim 64 wherein said arranging step further includes the step of configuring the superconductive material such that the incident light, which is incident on a surface of said layer of the superconductive material, emerges as said modulated light at a first spot on an opposite surface of said layer of the superconductive material in said first state, and at a distinct, second spot on said opposite surface of said layer of the superconductive material in said second state, and wherein said acting steps includes the step of guiding said modulated light to the output.

81. The method of claim 80 wherein said acting step further includes the step of selectively blocking said modulated light emerging at said second spot while transmitting substantially unaltered said modulated light emerging at said first spot.

82. The method of claim 80 wherein said guiding step includes the step of steering said modulated light emerging at said first spot in a first direction and steering said modulated light emerging at said second spot in a distinct, second direction.

83. The method of claim 82 wherein said guiding step further includes the step of using a prism for further spatially separating said modulated light emerging at said first spot from said modulated light emerging at said second spot.

84. The method of claim 82 wherein said guiding step further includes the step of positioning a dielectric wedge with respect to the superconductive material such that the modulated light emerging at said first spot is inciat on a surface of said dielectric wedge at Brewster's angle.

85. The method of claim 82 wherein said guiding step further includes the step of positioning a Brewster plate with respect to the superconductive material such that the modulated light emerging at said first spot is incident on a surface of said Brewster plate at Brewster's angle.

86. The method of claim 80 wherein said modulated light has a given polarization state, and wherein said guiding step includes the step of positioning an anisotropic crystal with respect to said superconducting material such that the modulated light emerging at said first spot is in a first polarization state and the modulated light emerging at said second spot is in a distinct, second polarization state.

87. The method of claim 64 wherein said arranging step includes the step of configuring the superconductive material to reflect the incident light such that the superconductive material, when in said first state, produces said modulated light with a first phase lag and, when in said second state, produces said modulated light with a second phase lag, and wherein said acting step includes the steps of:
   i) setting said input light in a known, initial polarization state,
   ii) compensating for said first phase lag such that, when the superconductive material is in said first state, said modulated light is linearly polarized while, when the superconductive material is in said second state, said modulated light is elliptically polarized following said compensating step,
   iii) guiding said modulated light to a dielectric plate, and
   iv) positioning said dielectric plate such that, when the superconductive material is in said first state, said modulated light is incident on said dielectric plate at Brewster's angle and said modulated light is transmitted substantially unaltered through said dielectric plate while, when the superconductive material is in said second state, at least a portion of said modulated light is reflected by said dielectric plate to the output.

88. The method of claim 87 further comprising the step of repeating, with a second dielectric plate, said directing, arranging and acting steps on said light reflected by the first mentioned dielectric plate such that an additional portion of said modulated light is redirected by said second dielectric plate to the output.

89. The method of claim 88 wherein said second dielectric plate reflects said additional portion of said modulated light to a distinct, second output.

90. The method of claim 87 further comprising the step of repeating, with a second dielectric plate, said directing, arranging and acting steps on a second input light in parallel with the first mentioned input light such that said portion of said modulated light reflected by the first mentioned dielectric plate is directed through said second dielectric plate, combined with a portion of modulated light produced from the second input light by said second dielectric plate and directed to the output.

91. A compensator arrangement having input light incident thereon, said compensator arrangement being configured to introduce a desired phase shift into input light and to provide a phase-shifted light at an output thereof, said compensator arrangement comprising:
   a) a mounting block including first and second mounting faces, said first and second mounting faces being configured such that said second mounting face is perpendicular to said first mounting face; and
   b) first and second superconductive films, each one of said first and second superconductive films being switchable between a first state, in which the each of the first and second superconductive films exhibits a first refractive index, and a second state, in which each of the first and second superconductive films exhibits a second refractive index, said first and second superconductive films being mounted on said first and second mounting faces, respectively, such that said second superconductive film is perpendicular to said first superconductive film and said input light is incident on the first superconductive film at an oblique angle, wherein said first and second superconductive films are configured such that the first superconductive film, when in said first state, reflects the input light toward the second superconductive film, which, when also in said first state, cooperates with the first superconductive film to introduce the desired phase shift into the reflected, input light and directs the reflected, input light as the phase shifted light to said output.

92. A method for introducing a desired phase shift into input light and providing a phase-shifted light at an output thereof, said method comprising the steps of:
   a) providing a mounting block including first and second mounting faces;
   b) mounting first and second superconductive films onto said first and second mounting faces, respectively, each one of said first and second superconductive films being switchable between a first state, in which the each of the first and second superconductive films exhibits a first refractive index, and a second state, in which each of the first and second superconductive films exhibits a second refractive index; and
   c) configuring said first and second mounting faces such that said second mounting face is perpendicular to said first mounting face, and consequently said second superconductive film is perpendicular to said first superconductive film, while said input light is incident on the first superconductive film at an oblique angle such that the first superconductive film, when in said first state, reflects the input light toward the second superconductive film, which, when also in said first state, cooperates with the first superconductive film to introduce the desired phase shift into the reflected, input light and directs the reflected, input light as the phase shifted light to said output.

* * * * *